(12) United States Patent
Wheatley

(10) Patent No.: US 11,500,138 B2
(45) Date of Patent: Nov. 15, 2022

(54) RETROREFLECTING ARTICLE WITH CONTRAST REDUCTION LAYER

(71) Applicant: 3M INNOVATIVE PROPERTIES COMPANY, St. Paul, MN (US)

(72) Inventor: John A. Wheatley, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 145 days.

(21) Appl. No.: 16/486,973

(22) PCT Filed: Feb. 19, 2018

(86) PCT No.: PCT/US2018/018639
§ 371 (c)(1),
(2) Date: Aug. 19, 2019

(87) PCT Pub. No.: WO2018/152473
PCT Pub. Date: Aug. 23, 2018

(65) Prior Publication Data
US 2020/0233123 A1    Jul. 23, 2020

Related U.S. Application Data

(60) Provisional application No. 62/461,173, filed on Feb. 20, 2017.

(51) Int. Cl.
*G02B 5/124*     (2006.01)
*G02B 5/20*      (2006.01)
*G02B 27/28*     (2006.01)

(52) U.S. Cl.
CPC ............. *G02B 5/124* (2013.01); *G02B 5/208* (2013.01); *G02B 27/286* (2013.01)

(58) Field of Classification Search
CPC .......... G02B 5/124; G02B 5/208; G02B 5/12; G02B 5/122; G02B 5/136; G02B 5/20;
(Continued)

(56) References Cited

U.S. PATENT DOCUMENTS

| 3,709,580 A | 1/1973 | Fugitt |
| 3,758,193 A | 9/1973 | Tung |

(Continued)

FOREIGN PATENT DOCUMENTS

| CN | 102902001 | 1/2013 |
| DE | 102009007124 | 8/2010 |

(Continued)

OTHER PUBLICATIONS

3M, Digital License Plate Thermal Transfer Ribbons, Product Bulletin TTR1300, May 2014 (Year: 2014).*

(Continued)

*Primary Examiner* — Stephone B Allen
*Assistant Examiner* — Adam W Booher
(74) *Attorney, Agent, or Firm* — Clifton F. Richardson; Daniel J. Iden

(57) ABSTRACT

Retroreflecting articles are described. In particular, retroreflecting articles including retroreflecting layers and contrast reduction layers are described. The contrast reduction layer decreases the near infrared retroreflective efficiency of the retroreflecting substrate by more than 50%.

13 Claims, 2 Drawing Sheets

(58) Field of Classification Search
CPC . G02B 5/22; G02B 5/02; G02B 5/021; G02B 5/0236; G02B 5/0273; G02B 5/0278; G02B 5/0294; G02B 27/286
See application file for complete search history.

(56) References Cited

U.S. PATENT DOCUMENTS

| | | |
|---|---|---|
| 4,361,911 A | 11/1982 | Buser |
| 6,010,223 A | 1/2000 | Gubela |
| 7,045,766 B2 | 5/2006 | Majima |
| 7,874,490 B2 | 1/2011 | Thomas, III |
| 8,113,434 B2 | 2/2012 | Thomas, III |
| 8,297,761 B2 | 10/2012 | Thakkar |
| 8,988,638 B2 | 3/2015 | Jiang |
| 2001/0012153 A1 | 8/2001 | Halter |
| 2003/0193717 A1 | 10/2003 | Gubela |
| 2007/0139775 A1 | 6/2007 | Reich |
| 2007/0242356 A1 | 10/2007 | Thakkar |
| 2008/0000976 A1 | 1/2008 | Thomas |
| 2008/0030854 A1* | 2/2008 | Hews .................. C09J 5/06 359/518 |
| 2009/0121014 A1 | 5/2009 | Tharp et al. |
| 2010/0151213 A1 | 6/2010 | Smithson |
| 2011/0080637 A1* | 4/2011 | Mullen .................. G02B 5/128 359/360 |
| 2012/0200710 A1 | 8/2012 | Nakajima |
| 2013/0114143 A1* | 5/2013 | Thakkar .................. G02B 1/04 359/530 |
| 2014/0307076 A1 | 10/2014 | Deutsch |
| 2015/0293282 A1* | 10/2015 | Takishita .............. G01J 5/0803 359/359 |
| 2015/0353029 A1 | 12/2015 | Fleming |
| 2016/0282528 A1* | 9/2016 | Yu .................... G02F 1/133516 |
| 2018/0196176 A1 | 7/2018 | Merrill |

FOREIGN PATENT DOCUMENTS

| | | |
|---|---|---|
| EP | 1975650 | 10/2008 |
| JP | 2012-195018 | 10/2012 |
| WO | WO 02/086596 | 10/2002 |
| WO | WO 2014-093428 | 6/2014 |
| WO | WO 2016-100733 | 6/2016 |
| WO | WO 2016-109620 | 7/2016 |

OTHER PUBLICATIONS

International Search Report for PCT International Application No. PCT/US2018/018639, dated Jun. 14, 2018, 3 pages.

* cited by examiner

RETROREFLECTING ARTICLE WITH CONTRAST REDUCTION LAYER

BACKGROUND

Retroreflecting articles are constructions that include at least a retroreflecting element. Retroreflecting elements reflect incident light back in substantially the same direction. Retroreflecting elements include cube-corner prismatic retroreflectors and beaded retroreflectors.

SUMMARY

In one aspect, the present description relates to retroreflecting articles. In particular, the present description relates to retroreflecting articles having a light incidence surface and including a retroreflecting layer and a contrast reduction layer disposed nearer the light incidence surface than the retroreflecting layer. The contrast reduction layer decreases the near-infrared retroreflective efficiency of the retroreflecting substrate by more than 50%.

DETAILED DESCRIPTION

Retroreflecting articles are useful in many situations. For example, providing direct and persistent illumination of signs or labels to promote readability or visibility can be prohibitively expensive or impractical. Instead, by using a retroreflector, light from sources such as car headlights can provide "on-demand" illumination, allowing an observer to view and interpret the sign.

As transportation infrastructure becomes more complicated, vehicles are gaining more driving autonomy. In order to navigate safely and effectively, sensing modules are increasingly incorporated into these vehicles to performs tasks from parking assistance, self-regulating cruise control and lane deviation warning to fully autonomous navigation and driving, including collision avoidance and traffic sign interpretation.

In order to sense the world around them, vehicles use a set of sensors that emit one or more points of light. For example, a lidar (light radar) system may use a constellation of points of light that move through the environment in order to detect potential obstacles or informational objects. These interrogating light beams may use a narrow wavelength band, for example, 2-20 nm, or may use a broad wavelength band, for example, 100 nm or more.

A challenge for these types of systems is they must simultaneously monitor and detect objects with different levels of reflectivity, making it difficult to calibrate or adjust the sensor system to an appropriate gain level. For example, a vehicle must sense pedestrians at the same time as trees, other vehicles, and traffic signs. Traffic signs, which are designed to be highly reflective, may overwhelm the sensor system, making it challenging to sense both reflective and non-reflective objects. Because the system needs to have sensitivity to detect both of these types of objects simultaneously, it cannot simply be corrected by adjusting the gain at the detector. Further, if traffic signs include coded or other patterned information to be read by vehicle sensors, the proper level of gain is even more important to be able to have accurate detection and interpretation.

Figure 1:
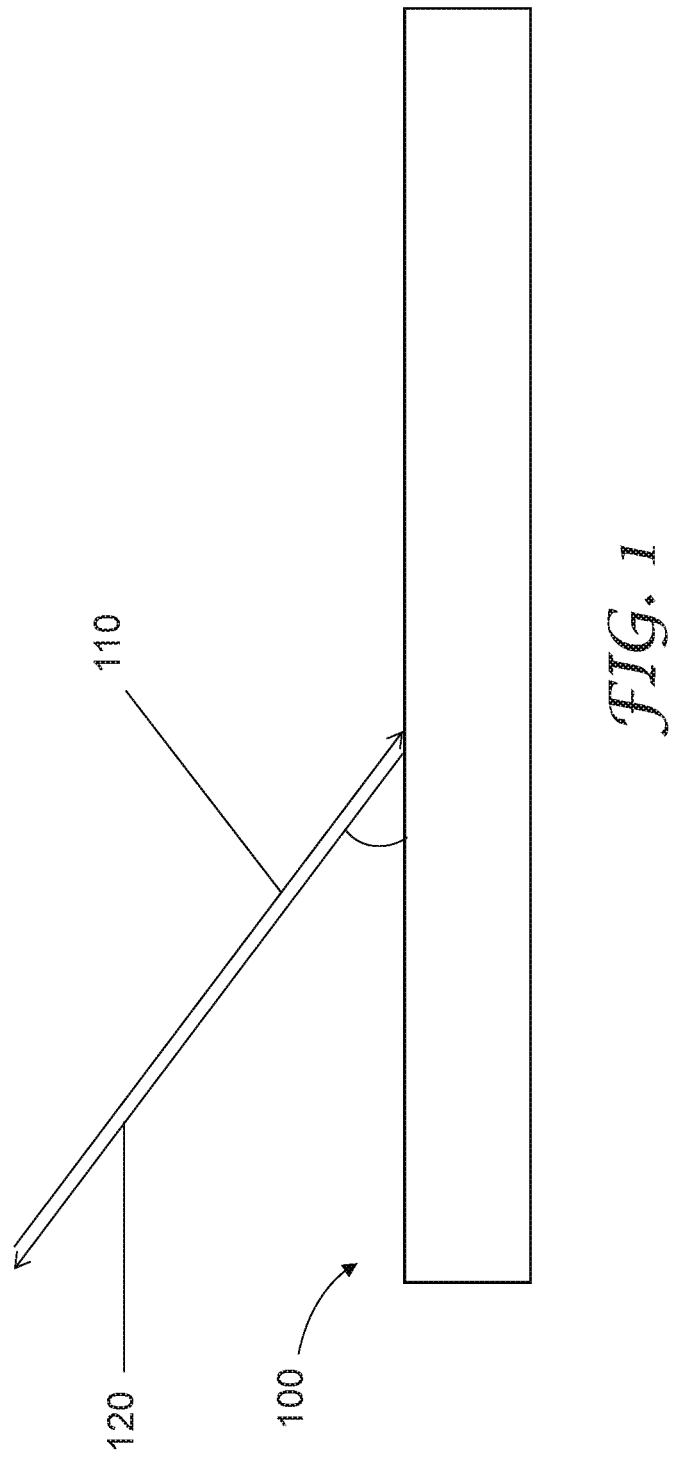
FIG. 1 is a side elevation schematic of a retroreflecting layer.

FIG. 1 is a side elevation schematic of a retroreflecting layer. Retroreflecting layer 100 is shown with incident ray 110 and retroreflected ray 120 being retroreflected by the retroreflecting layer. Retroreflecting layer 100 has an optical structure such that light is reflected substantially toward its source. In other words, any incident ray is reflected substantially 180° from its incident angle. For example, incident ray 110 is retroreflected as retroreflected ray 120, having substantially the same angle with retroreflecting layer 100. Because of the geometry of the optical structure of the retroreflecting layer, there may be some slight translation of the retroreflected ray from the incident ray. In other words, while the incident ray and the retroreflected ray will be substantially parallel, they need not be coincident.

Figure 2:
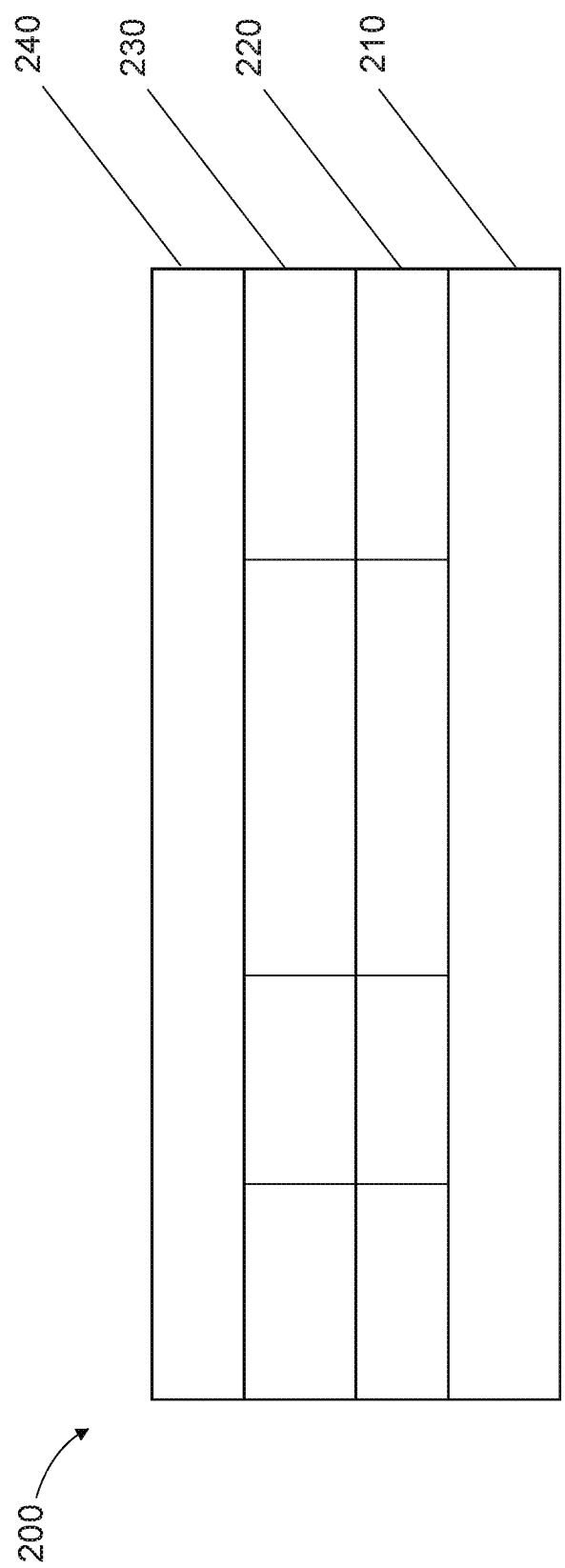
FIG. 2 is a side elevation schematic of a retroreflecting article.

FIG. 2 is a side elevation schematic of a retroreflecting article. Retroreflecting article 200 includes retroreflecting layer 210, retardation layer 220, and contrast reduction layer 230.

Retroreflecting layer 210 may be any suitable retroreflecting layer or combination of layers. Suitable retroreflectors include metal-backed or air-backed prismatic (cube-corner) retroreflectors, metal-backed beaded retroreflectors, and beaded retroreflectors partially immersed in binder optionally including, for example, nacreous or other reflective flake material.

The retroreflecting layer may be any suitable size and have any suitable size elements. For example, microreplicated prisms or beads used in the retroreflecting layer may be on the order of several micrometers in size (width or diameter), tens of micrometers in size, hundred of micrometers in size, or several millimeters in size, or even several centimeters in size. Beads of multiple different sizes and size distributions may be utilized as appropriate and suitable for the application. Depending on the retroreflected wavelength of interest, there may be a certain practical minimum feature size in order to prevent diffractive and other sub-wavelength feature effects from influencing or even dominating the desired optical performance.

For beaded retroreflectors, glass beads are commonly used, but any substantially spherical material can be used. The materials may be selected based on durability, environmental robustness, manufacturability, index of refraction, coatability, or any other physical, optical, or material property. The beads may be partially submerged into a reflective binder, containing, for example, nacreous or metal flake, or they may be partially metallized through vapor coating, sputter coating, or any other suitable process. In some embodiments, the beads may be coated with a dielectric material. In some embodiments, a metallic or metalized film may be laminated or otherwise attached to the bead surface. In some embodiments, the coating or layer may be a spectrally selective reflector. In some embodiments, beads may create an optical path, through a non-reflective binder, between the light incident surface of a retroreflector and a metal or metallized polymeric film as a substrate. The binder may have any physical properties and may impart certain desired properties to the retroreflecting layer. For example, the binder may include a pigment or dye to impart a colored effect to the retroreflecting article.

For prismatic retroreflectors, any suitable prismatic shape may be microreplicated or otherwise formed in a transparent (at least transparent to the wavelength of interest) medium. In some embodiments, a cast and cure microreplication process is used to form the prismatic surface. For example, right angle linear prisms, such as those in Brightness Enhancing Film (BEF), may be used, although such prism would not be retroreflecting over a very wide range of angles. Cube corners are widely used as a retroreflecting prismatic shape, where each incident light ray is reflected three times before being returned to the incident direction. Other surfaces having more facets may be used as a prismatic retroreflector. Any suitable microreplicatable resins may be used; in particular, resins that may be applied in a liquid or flowable form and then subsequently cured and removed from a tool may be used. The tool can be formed through any suitable process, including etching (chemical or reactive ion etching), diamond turning, and others. In some embodiments, the tool can be a fused or otherwise attached collection of multiple parts to cover a full prismatic sheet surface pattern. Curing may take place through the addition of heat or electromagnetic radiation. UV-curable resins or resins that are curable through atypical ambient conditions may be chosen as to not unintentionally partially or fully cure during handling or pre-cure processing. In some embodiments, additive or subtractive manufacturing processes may be used to form either a tool surface for microreplication or the prismatic surface itself.

Retardation layer 220 may be any suitable retardation layer that selectively slows one of the orthogonal components of light in order to change its polarization. In some embodiments, retardation layer 220 may be configured as a quarter wave retarder. A quarter wave retarder has a retardance that, for a certain wavelength of interest $\lambda$, has a retardance of $\lambda/4$. A quarter wave retarder for a given wavelength of light will convert it from circularly polarized light to linear polarized light or vice versa. In some applications, a quarter wave retarder may function acceptably without having perfect $\lambda/4$ retardance. For some applications, using an achromatic retarder may permit substantially quarter wave retardance to be maintained over a range of wavelengths; for example, a range of wavelengths spanning 2 nm, 10 nm, 20 nm, 40 nm, 50 nm, 100 nm, 150 nm, 200 nm, 300 nm, 400 nm, or even 500 nm. In some embodiments, the quarter wave retarder has substantially quarter wave retardance over the entire near-infrared wavelength range, for example, 700 to 1400 nm. In some embodiments, the quarter wave retarder has substantially quarter wave retardance over the entire visible wavelength range, for example, 400 to 700 nm. In some embodiments, the quarter wave retarder has substantially quarter wave retardance over both the near-infrared and visible range.

In some embodiments, retardation layer 220 may provide substantially similar retardance values over an wide range of incidence angles. In some embodiments, the retardance may not vary by more than 10% over a 30 degree half-angle cone, may not vary by more than 10% over a 45 degree half-angle cone, or may not vary by more than 10% over a 60 degree half-angle cone. For some applications, not varying more than 20% over a 30, 45, or 60 degree half angle cone may be acceptable.

Retardation layer 220 may include any suitable retarding material or materials. In some embodiments, retardation layer 220 includes or is a liquid crystal retarder. In some embodiments, retardation layer 220 includes an oriented birefringent polymer film. Depending on the birefringence of the chosen polymer set, suitable thickness may be chosen in order to obtain the desired retardation values. In some embodiments, retardation layer 220 may include a compensation film or other additional film with low retardance (for example, less than 100 nm of retardance) in order to enhance or preserve circularly polarized light over a wide range of angles for a wavelength or wavelength range of interest.

In some embodiments, retardation layer 220 may be unpatterned. In some embodiments it may be patterned, as shown in FIG. 2. Retardation layer 220 may include at least first regions and second regions, arranged in any spatial pattern, gradient, or any other arrangement. First regions and second regions differ at least by their retardation of incident light. For example, in one embodiment, first regions may have retardance of a quarter wave for incident light of a first wavelength. At the same time, second regions may have substantially zero retardance for incident light of that first wavelength. In some embodiments, second regions may substantially absorb light at that first wavelength. In some embodiments, second regions may substantially depolarize light at the first wavelength. Retardation layer 220, if patterned, may encode or display information. The information may be human readable, machine readable, or both human and machine readable.

Retroreflecting article 200 may enable particular sensor systems to operate with a high degree of fidelity. For example, a sensor that detects circularly polarized light (for example, a charge coupled device or CMOS used in conjunction with a filter that passes left-handed circularly polarized light may be a useful sensor configuration. Interrogated with left-handed circularly polarized light, for example, retroreflecting article 200 may provide certain portions (depending on the configuration and optics of retroreflecting layer 210 and retardation layer 220) that retroreflect left-hand circularly polarized light. These may appear bright or be otherwise detectable with such a sensor configuration. In other portions of retroreflecting article 200, the left-hand circularly polarized interrogation light may be depolarized, absorbed, or flipped to right-hand circularly polarized light. Such regions would appear dark or be difficult to detect with such a sensor configuration.

Though not restricted to circularly polarized light, in some embodiments, by utilizing such light, several potential advantages may be realized. In particular, circularly polarized light tends to be rare in nature, reducing the probability of a false positive signal or other interference. Further, in contrast, the use of linearly polarized light in these applications creates a very high sensitivity to the angle of incidence, significantly changing the appearance or intensity of retroreflected light rapidly depending on vertical and horizontal translation or observation angle.

In some embodiments, retroreflecting article 200 may be configured to operate in the near-infrared wavelength range. Certain sensor systems utilize near-infrared light in order to operate within wavelengths that are invisible to humans. In some embodiments, retroreflecting article 200 may include a retroreflecting layer 210 that retroreflects near-infrared light, and a retardation layer 220 that is configured as a quarter wave retarder for at least one wavelength in the near-infrared wavelength range.

Contrast reduction layer 230 may be any suitable contrast reduction layer, including layers that attenuate light through absorbing particular wavelengths. In some embodiments, broadband absorbers such as carbon black may be used. In some embodiments, selectively absorbing dyes or pigments may be used. In some embodiments, dyes or inks that pass light in a certain wavelength spectrum (i.e., that are transparent or highly transmissive in certain wavelength ranges) but absorb light in a different wavelength spectrum may be used. In some embodiments, a contrast reduction layer that absorbs light in the visible spectrum but substantially transmits light in the near-infrared spectrum may be used (i.e., a camouflage layer). In some embodiments, substantially transmits light means that 10%, 20%, 30%, 40%, 50%, 60%, 70%, or even 80% of light is transmitted, while for the absorbed wavelength, less than 10%, less than 5%, or even less than 1% is transmitted. For some applications, it may be desirable to have a visually inconspicuous retroreflector in order to provide information to detectors without being distracting or confusing. In some embodiments, contrast reduction layer 230 may reduce the light retroreflected from retroreflecting article 200 to avoid overglow, blooming, or other detection artifacts resulting from having a contrast that is too extreme.

Contrast reduction layer 230 may also be or include any surface or bulk scatterer in order to attenuate the light retroreflected along the expected cone of retroreflected angles. In other words, contrast reduction layer 230 may be any suitable material or combination of materials in order to reduce the well-known measurement of retroreflective efficiency, $R_A$. Retroreflectivity ($R_A$) can be measured using the test criteria described in ASTM E810-03 (2013)—Standard Test Method for Coefficient of Retroreflective Sheeting ($R_A$) using the Coplanar Geometry at 0.2° observation angle and 5° entrance angle, i.e. 0.2/5° angle.

In these embodiments where the contrast is reduced through scattering, it may also expand the useful detection angle of the illuminated retroreflector, which may be helpful for fast moving vehicles or difficult detection conditions.

In some embodiments, contrast reduction layer 230 is patterned. In some embodiments, contrast reduction layer 230 is patterned spatially similar or as an overlay to the patterning of the retardation layer. In some embodiments, certain regions of the contrast reduction layer may provide different levels of attenuation as part of the encoded information. In other words, a patterned contrast reduction layer 230 may provide greyscale information bits to be included on the retroreflecting article.

In some embodiments, particularly in applications where the patterned layers should be invisible to humans, retroreflecting article 200 also includes a visible absorbing layer 240. The visible absorbing layer may be disposed either nearer or farther from the light incidence surface than the contrast reduction layer. The visible absorbing layer may substantially transmit near-infrared light to be retroreflected while absorbing light within the visible wavelength band. In some embodiments, the visible absorbing layer may be a broadband visible absorber and appear black. In some embodiments, the visible absorbing layer may selectively absorb certain visible wavelengths, creating a colored appearance. The colored appearance may be useful for some applications to blend the retroreflecting article into its environment. In some embodiments, the visible absorbing layer may absorb at least 50%, 60%, 70%, 80%, or 90% of visible band light.

In some embodiments, the visible absorbing layer and the contrast reduction layer may be combined into a single layer, even though one or both may be patterned. As one example, the visible absorbing layer may be dyes or pigments spread throughout the combined layer, while the contrast reduction layer may be patterned or spatially variant over the retroreflecting article.

Retroreflecting articles as described herein may be useful for traffic control signs and directional/navigational infrastructure. In some embodiments, retroreflecting articles as described herein may be useful as rigid signs. In some embodiments, these articles may be or included in temporary traffic control devices, such as cones or flags or portable signs. In some embodiments, these articles may be used or incorporated into clothing or wearable items, such as conspicuity vests, helmets, or other safety equipment. In some embodiments, the retroreflecting articles may be conformable, bendable, or foldable. In some embodiments, these articles may be attached to any type of vehicle, such as a car, motorcycle, airplane, bicycle, quadcopter (drone), boat, or any other vehicle. In some embodiments, these articles can be used for inventory control in a warehouse, train yard, shipyard, or distribution center, allowing, for example, for the automated identification of the content of shelves, boxes, shipping containers, or the like.

Retroreflecting articles as described herein may be any suitable size, from small decals or stickers including pressure sensitive adhesive to large, highly visible traffic signs. Substrates to provide rigidity or easy adhesion (for example, pressure sensitive adhesion) may be also included behind the retroreflecting layer without affecting the optics of the retroreflecting article.

The following are exemplary embodiments according to the present disclosure:

Item 1. A retroreflecting article having a light incidence surface, comprising:
  a retroreflecting layer;
  a contrast reduction layer disposed nearer the light incidence surface than the retroreflecting layer;
  wherein the contrast reduction layer decreases the near-infrared retroreflective efficiency of the retroreflecting substrate by more than 50%.

Item 2. The retroreflecting article of item 1, wherein the contrast reduction layer decreases the near-infrared retroreflective efficiency through absorption.

Item 3. The retroreflecting article of item 1, wherein the contrast reduction layer decreases the near-infrared retroreflective efficiency through scattering.

Item 4. The retroreflecting article of item 3, wherein the contrast reduction layer includes a bulk scatterer.

Item 5. The retroreflecting article of item 3, wherein the contrast reduction layer includes a surface scatterer.

Item 6. The retroreflecting article of item 1, wherein the retroreflecting layer is patterned and includes at least first and second sections, and wherein the retroreflectivity is different for the first and second sections.

Item 7. The retroreflecting article of item 1, wherein the contrast reduction layer is patterned and includes at least first and second sections, and wherein the first section absorbs more than 80% of near-infrared light and the second section absorbs less than 80% of near-infrared light.

Item 8. The retroreflecting article of item 1, further comprising a visual absorbing layer, disposed either nearer or farther from the light incidence surface than the contrast reduction layer, wherein the visible absorbing layer absorbs at least 80% of light in the visible band.

Item 9. The retroreflecting article of item 1, wherein the retroreflecting article is conformable.

Item 10. The retroreflecting article of item 1, wherein the retroreflecting article is a tape.

Item 11. The retroreflecting article of item 1, wherein the retroreflecting article is flexible.

Item 12. The retroreflecting article of item 1, wherein the retroreflecting article shows a spatially variant pattern when interrogated with near-infrared light.

What is claimed is:

1. A retroreflecting article having a light incidence surface, comprising:
  a retroreflecting layer, the retroreflecting layer retroreflecting at least a portion of near-infrared light;
  a contrast reduction layer disposed nearer the light incidence surface than the retroreflecting layer; and a visible absorbing layer, the visible absorbing layer absorbing at least 80% of visible band light, wherein the contrast reduction layer decreases the near-infrared retroreflective efficiency of the retroreflecting layer by more than 50%, wherein the retroreflecting article shows a spatially variant pattern when interrogated with near-infrared light, the contrast reduction layer reducing a contrast of the spatially variant pattern.

2. The retroreflecting article of claim 1, wherein the contrast reduction layer decreases
the near-infrared retroreflective efficiency through absorption.

3. The retroreflecting article of claim 1, wherein the contrast reduction layer decreases
the near-infrared retroreflective efficiency through scattering.

4. The retroreflecting article of claim 3, wherein the contrast reduction layer includes
a bulk scatterer.

5. The retroreflecting article of claim 3, wherein the contrast reduction layer includes
a surface scatterer.

6. The retroreflecting article of claim 1, wherein the retroreflecting layer is patterned and includes at least first and second sections, and wherein the retroreflectivity is different for the first and second sections.

7. The retroreflecting article of claim 1, wherein the contrast reduction layer is patterned and includes at least first and second sections, and wherein the first section absorbs more than 80% of near-infrared light and the second section absorbs less than 80% of near-infrared light.

8. The retroreflecting article of claim 1, wherein the visible absorbing layer is disposed either nearer or farther from the light incidence surface than the contrast reduction layer.

9. The retroreflecting article of claim 1, wherein the retroreflecting article is conformable.

10. The retroreflecting article of claim 1, wherein the retroreflecting article is a tape.

11. The retroreflecting article of claim 1, wherein the retroreflecting article is flexible.

12. The retroreflecting article of claim 1, wherein the visible absorbing layer absorbs at least 90% of visible band light.

13. The retroreflecting article of claim 1, wherein the visible absorbing layer appears black.

* * * * *